US009864915B2

(12) United States Patent
Lee

(10) Patent No.: US 9,864,915 B2
(45) Date of Patent: Jan. 9, 2018

(54) AROUND VIEW MONITORING APPARATUS AND METHOD THEREOF

(71) Applicant: Hyundai Mobis Co., Ltd., Yongin-si (KR)

(72) Inventor: Seong soo Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 497 days.

(21) Appl. No.: 14/538,491

(22) Filed: Nov. 11, 2014

(65) Prior Publication Data

US 2016/0034768 A1 Feb. 4, 2016

(30) Foreign Application Priority Data

Aug. 4, 2014 (KR) ........................ 10-2014-0100002

(51) Int. Cl.
| | | |
|---|---|---|
| *G06K 9/00* | (2006.01) | |
| *B60R 1/00* | (2006.01) | |
| *G06K 9/46* | (2006.01) | |
| *G06T 7/00* | (2017.01) | |
| *H04N 5/232* | (2006.01) | |
| *H04N 5/247* | (2006.01) | |
| *G06T 3/40* | (2006.01) | |

(Continued)

(52) U.S. Cl.
CPC ............ *G06K 9/00812* (2013.01); *B60R 1/00* (2013.01); *G06K 9/4661* (2013.01); *G06T 3/4038* (2013.01); *G06T 7/0002* (2013.01); *G06T 7/13* (2017.01); *H04N 5/23238* (2013.01); *H04N 5/23293* (2013.01); *H04N 5/247* (2013.01); *B60R 2300/102* (2013.01); *B60R 2300/806* (2013.01); *G03B 37/04* (2013.01); *G06T 2207/10016* (2013.01); *G06T 2207/30264* (2013.01)

(58) Field of Classification Search
CPC .............................. B60R 1/00; G06K 9/00812
USPC ........................................................ 348/38
See application file for complete search history.

(56) References Cited

U.S. PATENT DOCUMENTS

| | | | |
|---|---|---|---|
| 7,659,835 B2 | 2/2010 | Jung | |
| 8,384,782 B2 | 2/2013 | Hiroshi | |

(Continued)

FOREIGN PATENT DOCUMENTS

| | | |
|---|---|---|
| CN | 100566406 | 12/2009 |
| CN | 102194226 | 9/2011 |

(Continued)

OTHER PUBLICATIONS

The Chinese Office Action dated Jun. 2, 2017, issued in Chinese Patent Application No. 201410612933.6.

*Primary Examiner* — Jeffery Williams
(74) *Attorney, Agent, or Firm* — H.C. Park & Associates, PLC

(57) ABSTRACT

An around-view monitoring (AVM) apparatus including a camera module for obtaining a plurality of video images from around a vehicle; a display unit for displaying an around-view video image; and a control unit for composing the plurality of video images to generate an around-view video image, detecting a first parking line and a second parking line from the around-view video image, tracking the detected first and second parking lines, and generating an imaginary parking line when any one of the first and second parking lines is not tracked to control the display unit to output the around-view video image.

11 Claims, 11 Drawing Sheets

(51) Int. Cl.
*G06T 7/13* (2017.01)
*G03B 37/04* (2006.01)

(56) References Cited

U.S. PATENT DOCUMENTS

| | | | | | |
|---|---|---|---|---|---|
| 2007/0041659 | A1* | 2/2007 | Nobori | ................... | B60R 1/00 |
| | | | | | 382/284 |
| 2009/0177392 | A1* | 7/2009 | Komaba | ............ | G01C 21/3697 |
| | | | | | 701/431 |
| 2009/0278709 | A1* | 11/2009 | Endo | .................... | B62D 15/027 |
| | | | | | 340/932.2 |
| 2009/0303080 | A1* | 12/2009 | Kadowaki | .......... | B62D 15/0275 |
| | | | | | 340/932.2 |
| 2011/0216194 | A1* | 9/2011 | Kosaki | .................... | H04N 7/18 |
| | | | | | 348/148 |
| 2015/0302574 | A1* | 10/2015 | Muramatsu | ........ | B62D 15/0275 |
| | | | | | 348/148 |

FOREIGN PATENT DOCUMENTS

| | | |
|---|---|---|
| JP | 2010-200240 | 9/2010 |
| JP | 2014-106731 | 6/2014 |
| JP | 2014106731 A * | 6/2014 |
| KR | 10-2008-0024772 | 3/2008 |
| KR | 10-2013-0028230 | 3/2013 |
| KR | 10-2013-0050682 | 5/2013 |

* cited by examiner

SECOND PARKING LINE

SECOND PARKING LINE

AROUND VIEW MONITORING APPARATUS AND METHOD THEREOF

CROSS-REFERENCE TO RELATED APPLICATIONS

This application claims priority from and the benefit of Korean Patent Application No. 10-2014-0100002, filed on Aug. 4, 2014, which is hereby incorporated by reference for all purposes as if fully set forth herein.

BACKGROUND

Field

Exemplary embodiments relate to an around-view monitoring (AVM) apparatus which displays a video image from all around a vehicle and a method thereof. More particularly, exemplary embodiments relate to an AVM apparatus which displays an AVM screen, including an imaginary parking line, and a method thereof Discussion of the Background Recently, in accordance with continuing improvement and multi-functionalization of motor vehicles, an around-view monitoring (hereinafter, abbreviated as "AVM") system is mounted in the vehicle.

The AVM system acquires video images from all around the vehicle through cameras which are mounted in four directions of the vehicle, and allows a driver to check surroundings of the vehicle through a display device which is mounted inside the vehicle without intentionally looking back or checking the surroundings at the time of parking a vehicle. Further, the AVM system composes the video images of the surroundings to provide a 360° view around the vehicle, as viewed from the top of the vehicle. The driver may determine a situation around the vehicle at a glance to safely park the vehicle or drive on a narrow road using the AVM system.

However, when a part of a parking line is blocked by another vehicle, the AVM system of the related art may not display a clear parking line at the time of assisting with the parking, as disclosed in Korean Unexamined Patent Application Publication No. 10-2013-0028230.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an AVM apparatus which displays an AVM screen, including an imaginary parking line and a method thereof.

Additional aspects will be set forth in the detailed description which follows, and, in part, will be apparent from the disclosure, or may be learned by practice of the inventive concept.

An exemplary embodiment of the present invention provides an AVM apparatus, including: a camera module configured to obtain a plurality of video images from around a vehicle; a display unit configured to display an AVM video; and a control unit configured to compose the plurality of video images to generate a AVM video, detect a first parking line and a second parking line from the AVM video, track the detected first and second parking lines, and generate an imaginary parking line when any one of the first and second parking lines is not tracked to control the display unit to output the AVM video.

An exemplary embodiment of the present invention also discloses a method of operating an AVM apparatus, the method including: obtaining a plurality of video images from around a vehicle; generating an AVM video image by composing the plurality of video images; detecting a first parking line and a second parking line from the AVM video; tracking the first and second parking lines; predicting an imaginary parking line when any one of the first and second parking lines is not tracked; and displaying an AVM including the imaginary parking line.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
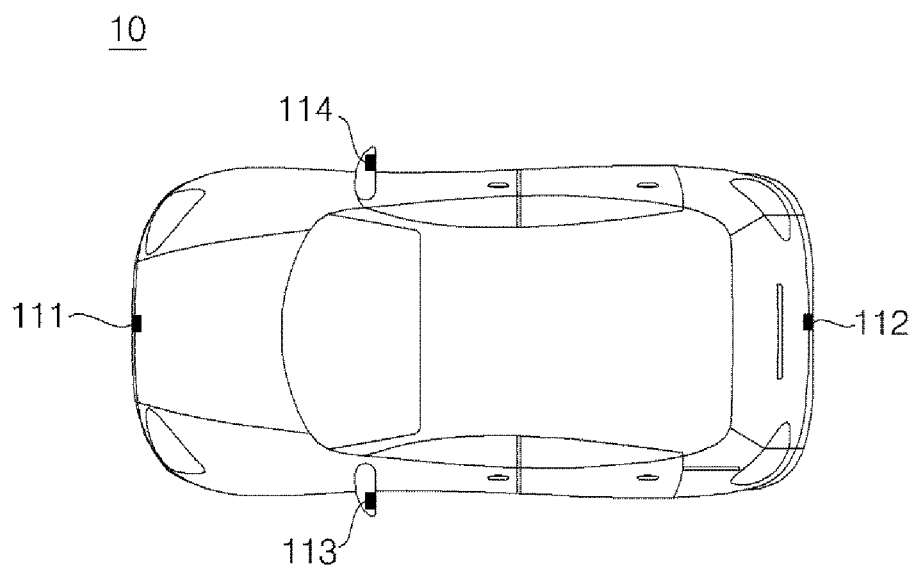
FIG. 1A and FIG. 1B are top and side views, respectively, which schematically illustrate a vehicle which includes an AVM apparatus according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "configure", "have", "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof FIG. 1 is a view schematically illustrating a vehicle which includes an AVM apparatus according to an exemplary embodiment of the present invention.

Figure 1B:
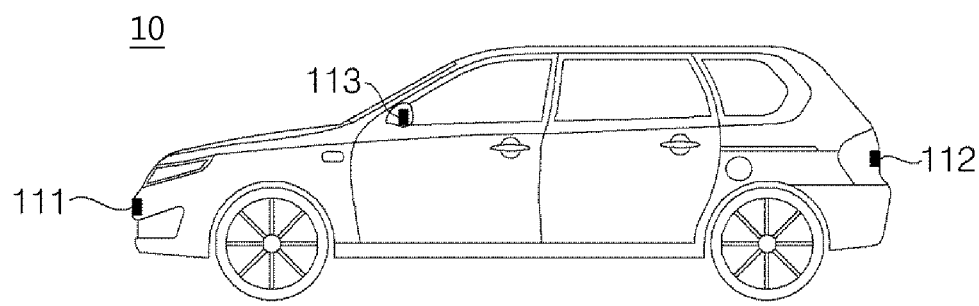
Figure 2:
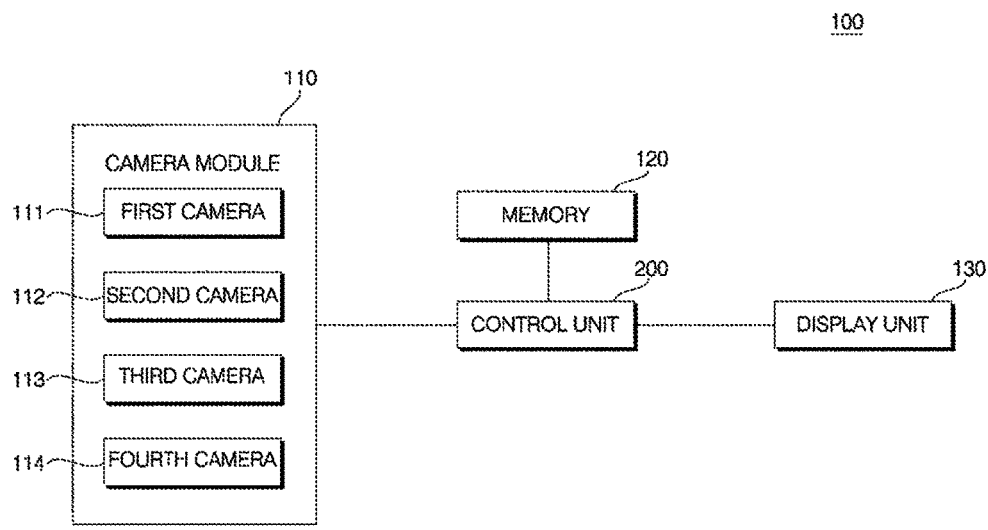
FIG. 2 is a block diagram of an AVM apparatus according to an exemplary embodiment of the present invention.

Referring to FIGS. 1A, 1B, and 2, an AVM apparatus 100 which is mounted in a vehicle 10 includes a camera module 110. The camera module 110 may include a plurality of cameras. For example, in an exemplary embodiment the camera module may include a first camera 111, a second camera 112, a third camera 113, and a fourth camera 114 that are desirably provided so as to acquire video images of a front side, a rear side, a left side, and a right side, respectively, of the vehicle 10, although more cameras may be utilized.

The camera module 110 is provided at the outside of the vehicle 10 to acquire video images around the vehicle 10. Here, the camera which is included in the camera module 110 is desirably a super wide angle camera having an angle of view of 180 degrees or larger.

The first camera 111 may be provided at the front side of the vehicle 10 to acquire a video image from around the front side of the vehicle 10. The first camera 110 may be installed on a portion of a front bumper.

The second camera 112 may be provided at the rear side of the vehicle to acquire a video image from around the rear side of the vehicle 10. The second camera 112 may be installed on a portion of a rear bumper, that is, an upper side or a lower side of a license plate.

The third camera 113 may be installed on the left side of the vehicle 10 to acquire a video image from around the left side of the vehicle 10. The third camera 113 may be installed on a portion of a left side mirror of the vehicle 10, or a portion of a front fender.

The fourth camera 114 may be installed on the right side of the vehicle 10 to input a video image from around the right side of the vehicle 10. The fourth camera 114 may be installed on a portion of a right side mirror of the vehicle 10, or a portion of the front fender.

FIG. 2 is a block diagram of an AVM apparatus according to an exemplary embodiment of the present invention.

Referring to FIG. 2, the AVM apparatus 100 includes the camera module 110, a memory 120, a display unit 130, and a control unit 200.

The camera module 110 acquires video images around the vehicle 10. In this case, a plurality of video images around the vehicle may be acquired. For example, the camera module 110 may include a plurality of cameras 111, 112, 113, and 114 and acquire a plurality of video images from the individual cameras.

In the present exemplary embodiment, the first to fourth cameras 111, 112, 113, and 114 may transmit the acquired video images to the control unit 200, but the present invention is not limited thereto. The AVM apparatus 100 according to the exemplary embodiment of the present invention may further include a separate camera control unit (not illustrated), and the video images acquired by the first to fourth cameras 111, 112, 113, and 114 may be transmitted to the camera control unit (not illustrated), and then transmitted to the control unit 200.

The memory 120 may store basic data for a unit, control data for controlling an operation of the unit, and input/output data. The memory 120 may include various storage units, such as a ROM, a RAM, an EEPROM, a flash drive, and a hard drive. The memory 120 may store video images from around the vehicle that are acquired by the camera module 110. The memory 120 may store an AVM video image generated in the control unit 200. The memory 120 may store a look-up table. Here, the look-up table is used to compose video images acquired by the camera module 110. The look-up table stores a relationship indicating that one pixel of a composite video image corresponds to any pixel of four original video images (first to fourth video images).

The display unit 130 receives and displays an around-view video. The display unit 130 may include at least one display to display the around-view video. When the around-view video image is displayed, various user interfaces may be provided or a touch sensor which allows touch input for the provided user interface may be provided. Further, the display unit 130 may be an audio visual navigation (AVN) module which is mounted on the vehicle.

The control unit 200 composes the plurality of video images which is transmitted from the camera module 110 to generate an around-view video. The control unit 180 may detect a first parking line and a second parking line from the around-view video. In this case, the first parking line and the second parking line may be parking lines at the left side and the right side of the vehicle 10. That is, the first parking line and the second parking line may be parking lines in a longitudinal direction of the vehicle 10. The control unit 200 tracks the first and second parking lines. While the camera module 110 acquires video images around the vehicle 10, the vehicle 10 may continuously move. In this case, the positions of the first and second parking lines may move in the around-view video image in accordance with the movement of the vehicle. In this case, the control unit 200 tracks the first and second parking lines. If any one of the first and second parking lines is not tracked, the control unit 200 generates an imaginary parking line. The control unit 200 controls the display unit 130 to output an around-view video image including the imaginary parking line.

Figure 3:
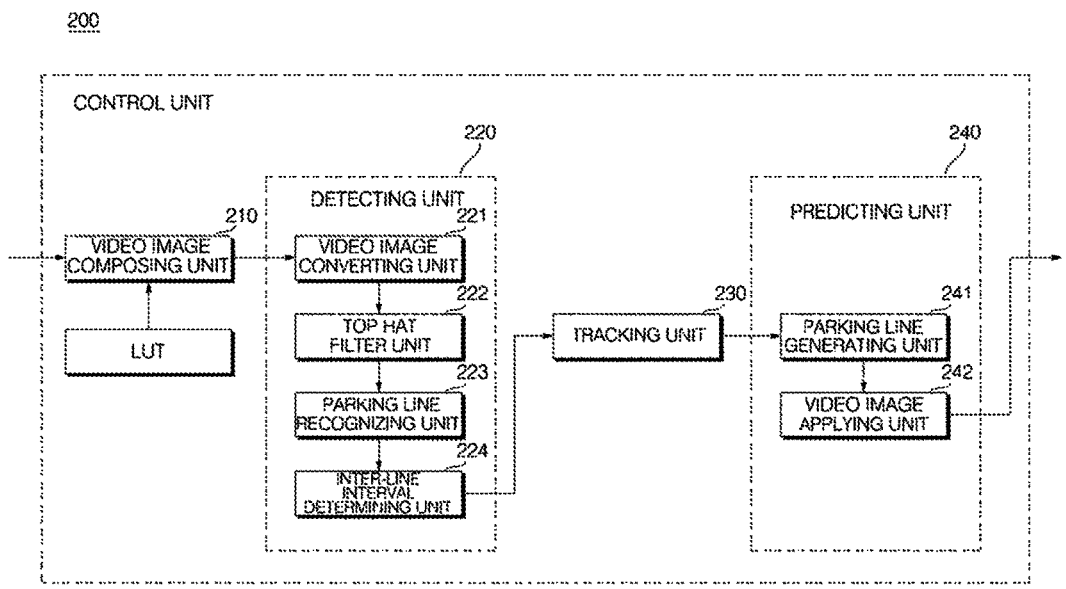
FIG. 3 is a specific block diagram of a control unit according to an exemplary embodiment of the present invention.

FIG. 3 is a specific block diagram of a control unit according to an exemplary embodiment of the present invention.

Referring to FIG. 3, the control unit 200 includes a video image composing unit 210, a detecting unit 220, a tracking unit 230, and a predicting unit 240.

The video image composing unit 210 composes the plurality of video images received by the camera module 110 to generate an around-view video. Here, the around-view video image may be a top view video image in which the vehicle 10 is disposed at the center.

The video image composing unit 210 may compose the plurality of video images using the look-up table LUT. The look-up table is a table which stores a relationship indicating that one pixel of a composite video corresponds to any pixel of four original video images (first to fourth video images).

The detecting unit 220 detects the first parking line and the second parking line from the around-view video generated in the video composing unit 210. In order to detect the first parking line and the second parking line, the detecting unit 220 may include a video image converting unit 221, a top hat filter unit 222, a parking line recognizing unit 223, and an inter-line interval determining unit 224.

The video image converting unit 221 converts the around-view video image into a grayscale video image in accordance with a predetermined video image converting scheme.

The top hat filter unit 222 may extract, from the grayscale video, the plurality of feature points corresponding to points at which an illumination deviation is generated.

For example, the top hat filter unit 222 generally measures an illumination deviation between a white parking line and a normal road to extract a center point of a portion where the illumination deviation is generated, as the feature point.

The parking line recognizing unit 223 extracts a line component for the plurality of feature points to recognize the first and second parking lines. The parking line recognizing unit 223 compares errors of angles of the recognized first and second parking lines. That is, the parking line recognizing unit 223 determines whether the recognized first and second parking lines are parallel to each other. For example, when an angle formed by lines extending from the recognized first and second parking lines is 5 degrees or smaller, the first and second parking lines are determined to be available. In this case, the first parking line and the second parking line may be parking lines at the left side and the right side of the vehicle 10. That is, the first parking line and the second parking line may be parking lines oriented in a longitudinal direction of the vehicle 10.

The inter-line interval determining unit 224 determines an inter-line interval between the first parking line and the second parking line. That is, the inter-line interval determining unit 224 calculates an inter-line interval between the first parking line and the second parking line from the around-view video. In the consecutive video images, when a difference in the inter-line interval between the first parking line and the second parking line is less than a threshold value, the inter-line interval determining unit 224 determines the inter-line interval by an average of a plurality of inter-line intervals between the first parking line and the second parking line of the video.

The tracking unit 230 tracks the first parking line and the second parking line from the consecutive around-view video images. While the camera module 110 acquires video images from around the vehicle 10, the vehicle 10 may continuously move. In this case, in accordance with the movement of the vehicle, the positions of the first parking line and the second parking line may relatively move in the around-view video. In this case, the control unit 200 tracks the first and second parking lines. The tracking unit 230 may track the first and second parking lines in both a previous video image and a present video image based on a difference of angles or distances between the first and second parking lines.

For example, when a left upper end of the around-view video image is considered as an original point, a horizontal direction is assumed as an X axis and a vertical direction is assumed as a Y axis. In this case, an angle of the parking line may be an angle formed by the X axis and an imaginary line when an imaginary line, which is perpendicular to the parking line, is drawn from an original point. Further, the distance between the first and second parking lines may refer to a length of the imaginary line. In this case, when the present video image and a video image of a predetermined time earlier are compared, if the difference of the angles and the difference of the distances in a video image which changes in accordance with the time are less than threshold values, the tracking unit 230 determines that the detected parking lines are the same, and tracks the parking lines.

When any one of the first and second parking lines is not tracked, the predicting unit 240 generates an imaginary parking line. That is, the predicting unit 240 replaces the parking line that is not tracked with the imaginary parking line.

The predicting unit 240 includes a parking line generating unit 241 and a video image applying unit 242.

When any one of the first and second parking lines is not tracked, the parking line generating unit 241 generates an imaginary parking line which is not tracked.

For example, when the first parking line is not tracked, the parking line generating unit 241 may predict the first parking line based on the second parking line and the inter-line interval.

For example, when the second parking line is not tracked, the parking line generating unit 241 may predict the second parking line based on the first parking line and the inter-line interval.

The video image applying unit 242 applies the imaginary parking line that is generated by the parking line generating unit to an around-view video image.

Figure 4:
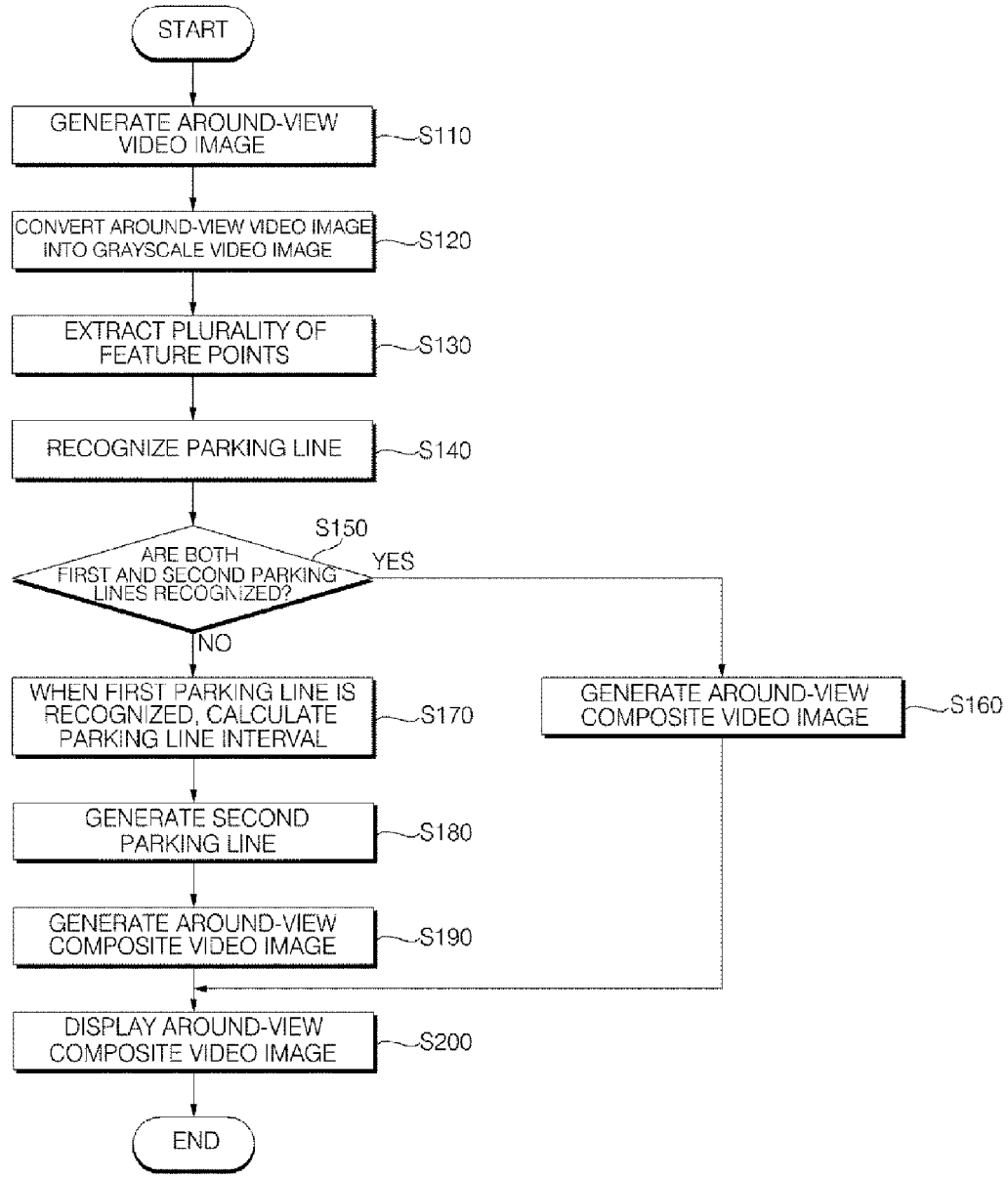
FIG. 4 is a flow chart illustrating an operation of an AVM apparatus according to a first exemplary embodiment of the present invention.

FIG. 4 is a flow chart illustrating an operation of an AVM apparatus according to a first exemplary embodiment of the present invention.

Referring to FIG. 4, when the vehicle enters a target parking section, the control unit 200 generates an AVM video image in which a view for a surrounding video image of the vehicle is generated in step S110, converts the AVM video image into a grayscale video image in step S120, and extracts a plurality of feature points using an illumination deviation of the grayscale video image in step S130.

In this case, the control unit 200 extracts line components for the plurality of feature points to recognize the parking line in step S140.

Here, in step S150, the control unit 200 determines whether both the first and second parking lines of the parking lines are recognized in step S140, and when both the first and second parking lines are recognized, composes the first and second parking lines with the around-view video image with the same color to generate an around-view composite video image in step S160.

When only the first parking line of the first and second parking lines is recognized in step S150, the control unit 200 calculates a parking line interval of the target parking section in step S170, and generates the second parking line which is spaced apart from the first parking line in parallel to each other with the parking line interval in step S180.

Next, the control unit 200 generates the around-view composite video image obtained by composing the first and second parking lines having different colors with the around-view video image in step S190.

The control unit 200 displays the around-view composite video image, which is generated in any one of steps S160 and S190, in step S200.

Figure 5:
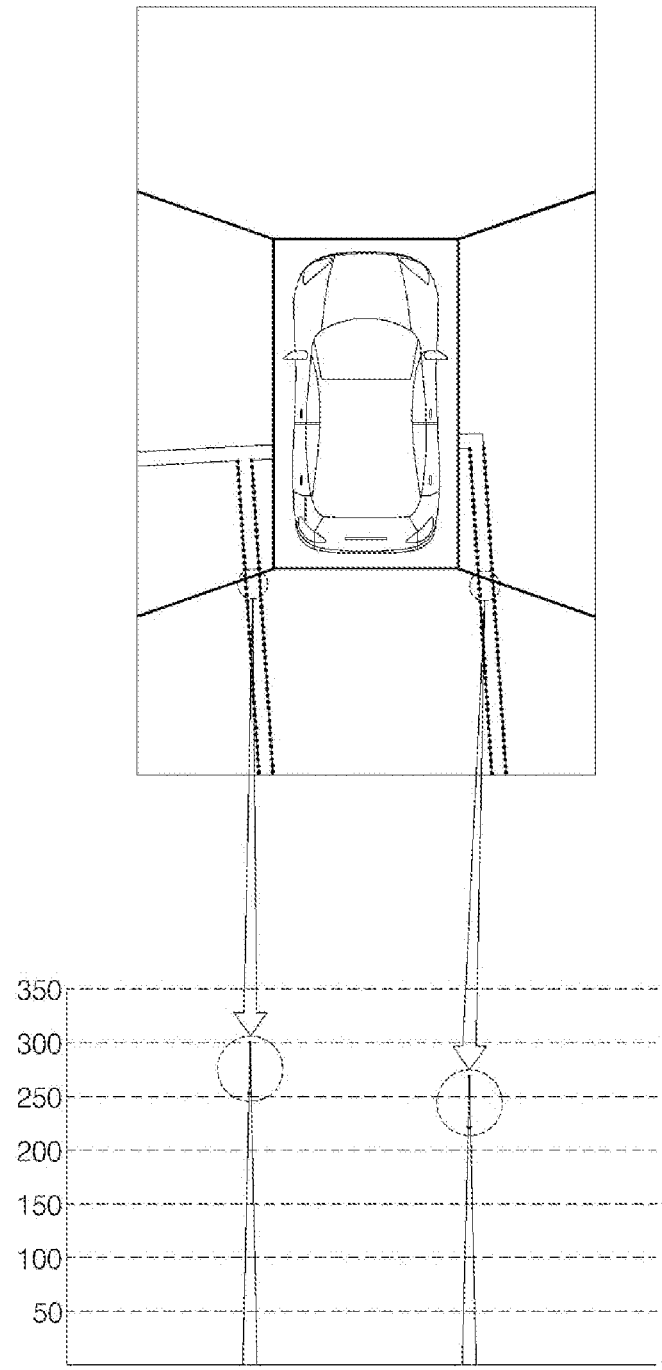
FIG. 5 is a view illustrating an operation of extracting a feature point of a parking line according to an exemplary embodiment of the present invention.

FIG. 5 is a view illustrating an operation of extracting a feature point of a parking line according to an exemplary embodiment of the present invention.

Referring to FIG. 5, the top hat filter unit 222 may extract the plurality of feature points corresponding to points at which an illumination deviation is generated, from the grayscale video image, which is converted by the video image converting unit 221. That is, the top hat filter unit 222 measures the illumination deviation of the white parking line and a normal road to extract a portion in which the illumination deviation is generated as the feature point. The top hat filter unit 222 detects a center point between the feature points.

Figure 6A:
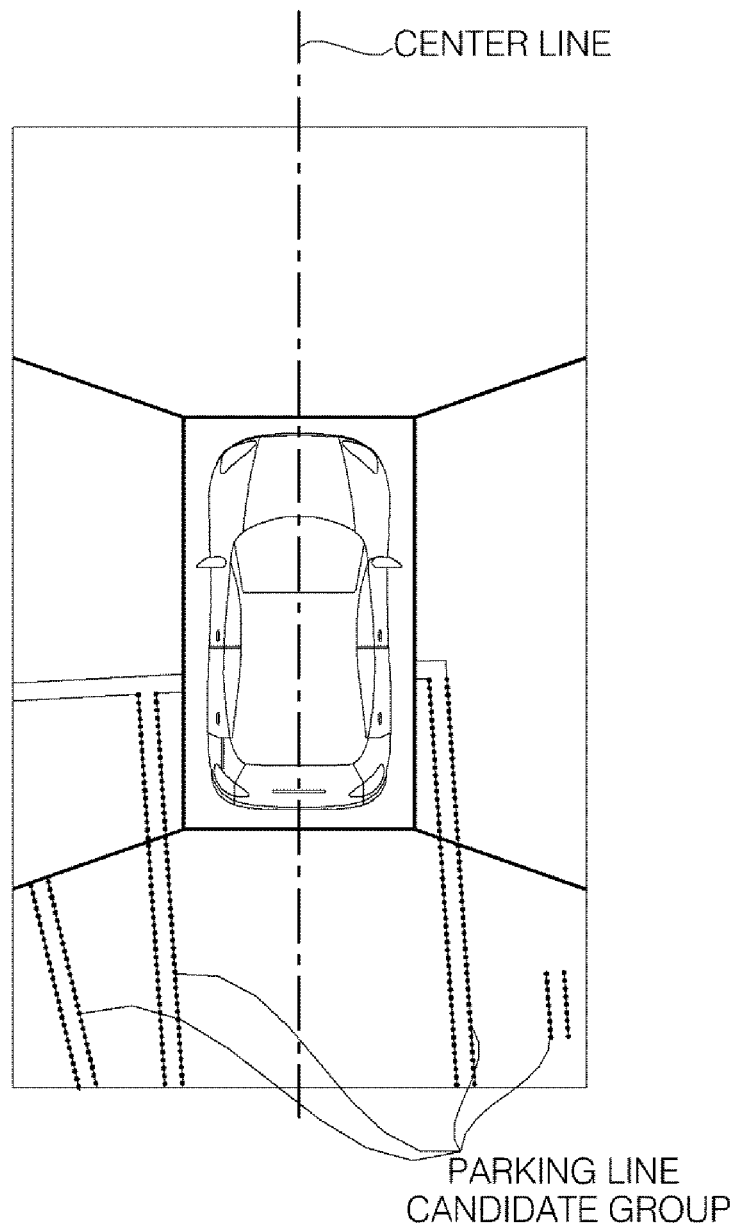
FIG. 6A and FIG. 6B are views illustrating an operation of recognizing a parking line according to exemplary embodiment of the present invention.
Figure 6B:
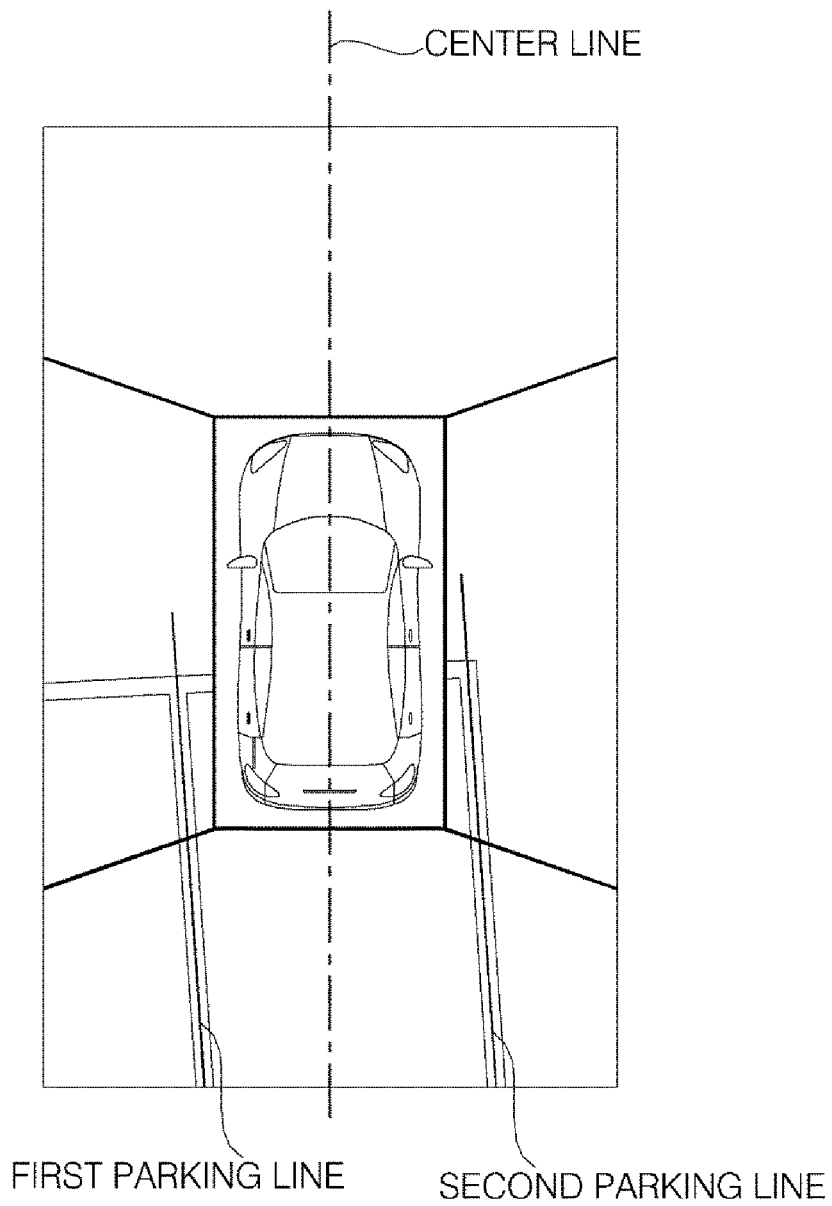

FIGS. 6A and 6B are views illustrating an operation of recognizing a parking line according to exemplary embodiment of the present invention.

Referring to FIGS. 6A and 6B, the parking line recognizing unit 223 connects the feature points which are extracted in FIG. 5 or the center point to detect the line component. In this case, the parking line recognizing unit 223 may recognize two parallel line components from the plurality of detected line components as first and second parking lines. In this case, the parking line recognizing unit 223 may determine whether to be parallel based on whether an error of an angle between the first and second parking lines is within a predetermined range. For example, when an angle formed by extending two lines is 5 degrees or less, the parking line recognizing unit 223 may recognize the two lines as the first and second parking lines.

FIG. 6A illustrates a plurality of parking line candidate groups by extracting the line components for the plurality of feature points extracted in FIG. 5 and the center point, and FIG. 6B illustrates first and second parking lines corresponding to the target parking section which are recognized from the plurality of parking line candidate groups illustrated in FIG. 6A.

Figure 7A:
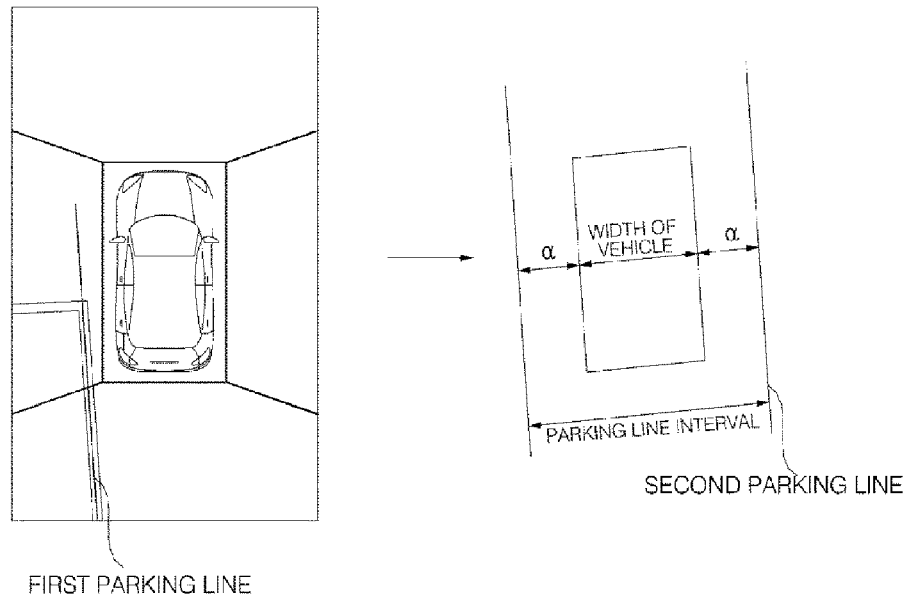
FIG. 7A and FIG. 7B are views illustrating an operation of recognizing a first parking line and predicting a second parking line, respectively, according to an exemplary embodiment of the present invention.
Figure 7B:
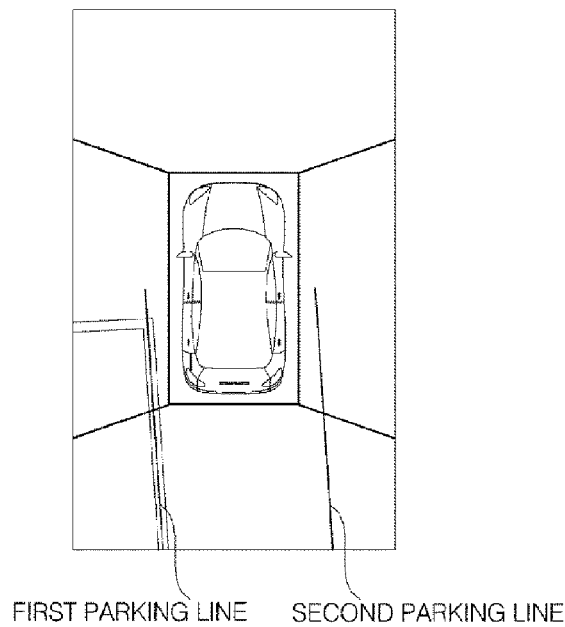

FIGS. 7A and 7B are views illustrating an operation of recognizing a first parking line and predicting a second parking line according to an exemplary embodiment.

That is, as illustrated in FIG. 7A, the control unit 200 may calculate the interval of the parking lines based on at least one of a width of the vehicle, a distance a from the first parking line, and a steering angle.

Here, when a present position of the vehicle is set to be positioned at the center of the target parking section, the control unit 200 may calculate the interval of the parking lines using the width of the vehicle and the distance a from the first parking line, which is not specifically limited.

Next, the control unit 200 composes the second parking line which moves by the interval of the parking lines to be parallel with the first parking line based on the calculated interval of the parking lines with the around-view video image to generate the around-view composite video image.

In the meantime, as illustrated in FIG. 7B, the control unit 160 displays the first and second parking lines with different colors on a display module 120 so as to allow the driver to recognize the second parking line as an imaginary parking line.

Figure 8:
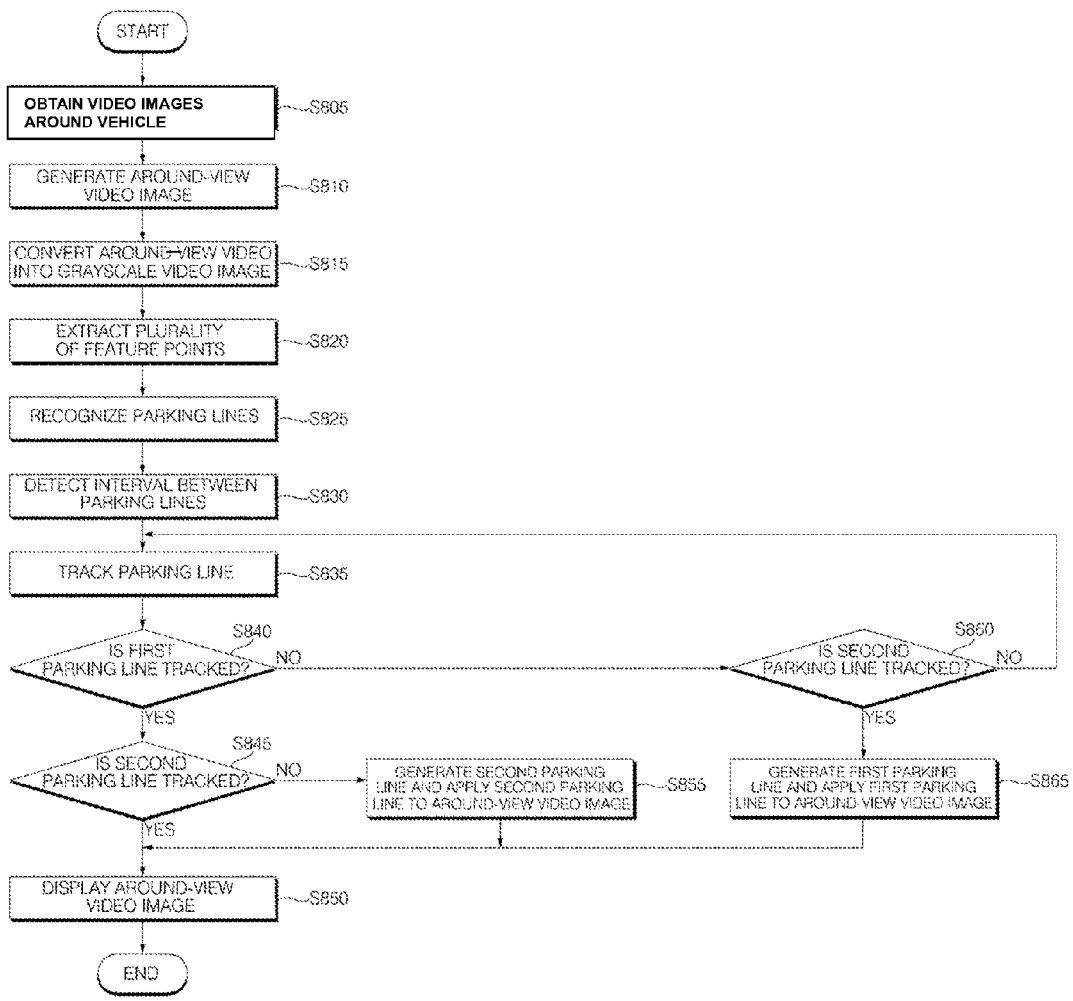
FIG. 8 is a flow chart illustrating an operation of an AVM apparatus according to another exemplary embodiment of the present invention.

FIG. 8 is a flow chart illustrating an operation of an AVM apparatus according to another exemplary embodiment of the present invention.

Referring to FIG. 8, a camera module 110 acquires video images from around the vehicle 10 in step S805. A plurality of video images may be acquired from around the vehicle. For example, the camera module 110 may include a plurality of cameras 111, 112, 113, and 114, and acquire a plurality of video images from the individual cameras.

In a state when the plurality of video images is received, the control unit 200 receives the plurality of video images from the camera module 110 and composes the plurality of video images to generate an around-view video image in step S810. Here, the around-view video may be a top view video image in which the vehicle 10 is disposed at the center. The video composing unit 210 may compose the plurality of video images using the look-up table stored in the memory 120. The look-up table is a table which stores a relationship indicating that one pixel of a composite video corresponds to any pixel of four original video images (first to fourth video images).

In a state when the around-view video image is generated, the control unit 200 detects a first parking line and a second parking line in steps S815, S820, S825, and S830.

Specifically, in a state when the around-view video image is generated, the control unit 200 converts the around-view video image into a grayscale video image in step S815. In a state when the around-view video image is converted into the grayscale video image, the control unit 200 extracts a plurality of feature points using an illumination deviation of the grayscale video image in step S820. The control unit 200 extracts line components of the plurality of feature points to recognize the first and second parking lines in step S825. In this case, the first parking line and the second parking line may be parking lines at the left side and the right side of the vehicle 10. That is, the first parking line and the second parking line may be parking lines oriented in a longitudinal direction of the vehicle 10. The control unit 200 determines an inter-line interval between the recognized first and second parking lines in step S830. That is, the control unit 200 calculates an inter-line interval between the first parking line and the second parking line in the around-view video image. In consecutive video images, when a difference in the inter-line interval between the first parking line and the second parking line is less than a threshold value, the control unit 200 determines the inter-line interval by an average of the plurality of inter-line intervals between the first parking line and the second parking line of the video.

Next, the control unit 200 tracks the first and the second parking lines from the consecutive around-view video images in step S835. While the camera module 110 acquires video images around the vehicle 10, the vehicle 10 may continuously move. In this case, the positions of the first and second parking lines may move in the around-view video image in accordance with the movement of the vehicle. In this case, the control unit 200 tracks the first and second parking lines. The control unit 200 may track the first and second parking lines from the previous video image and the present video image based on the difference of the angles and the difference of the distances between the first and second parking lines.

Figure 10A:
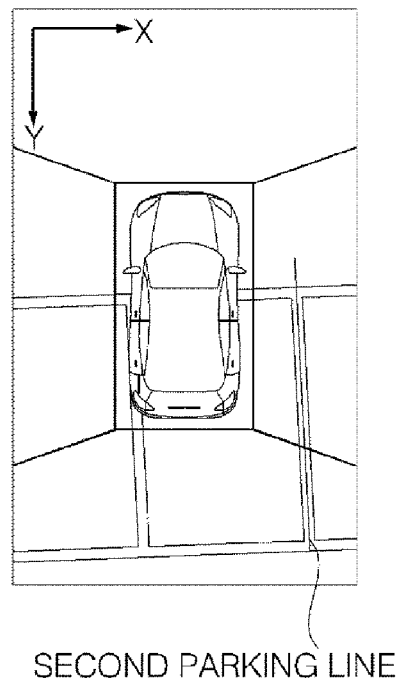
FIG. 10A, FIG. 10B, FIG. 10C, and FIG. 10D are views illustrating an operation of recognizing a second parking line and predicting a first parking line according to the exemplary embodiment shown in FIG. 8.
Figure 10B:
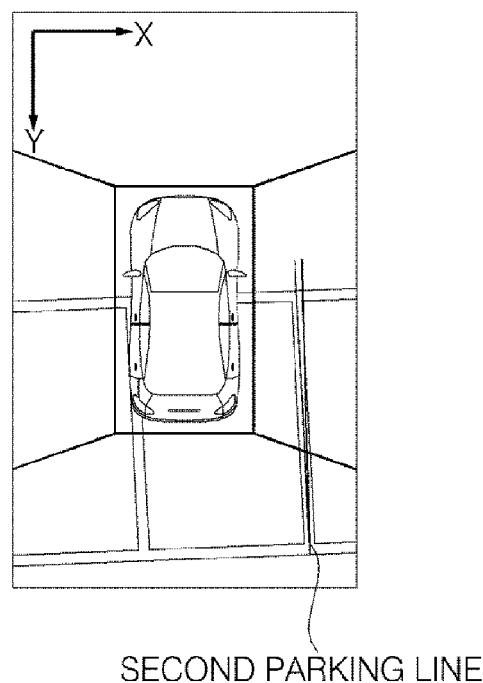
Figure 10C:
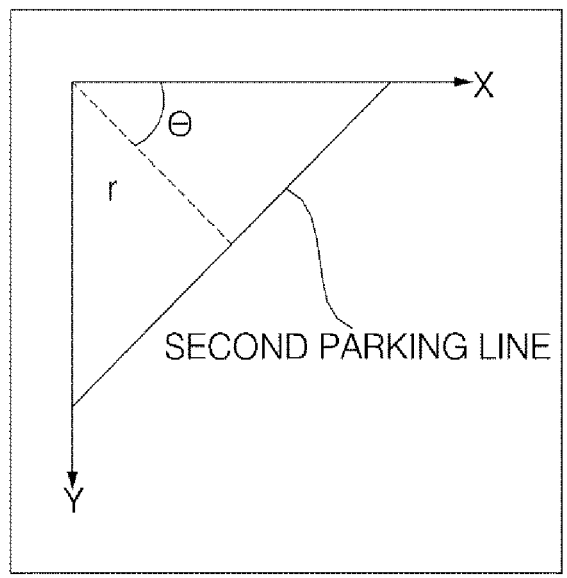

For example, when a left upper end of the around-view video image is considered as an original point, a horizontal direction is assumed as an X axis and a vertical direction is assumed as a Y axis, as shown in FIG. 10C. In this case, the angle of the parking line may be an angle formed by the X axis and an imaginary line when the imaginary line, which is perpendicular to the parking line, is drawn from the original point. Further, the distance between the first and second parking lines may refer to a length of the imaginary line. In this case, when the present video image and a video image of a predetermined earlier time are compared, if the difference of the angles and the difference of the distances in a video image which changes in accordance with the time are less than threshold values, the tracking unit 230 determines that the detected parking lines are the same and tracks the parking lines.

If the first parking line is tracked in step S840 and the second parking line is tracked in step S845, the control unit 200 controls the display unit 130 to display the around-view video image in step S850.

If the first parking line is tracked in step S840 but the second parking line is not tracked in step S845, the control unit 200 generates a second imaginary parking line to apply the second imaginary parking line to the around-view video image in step S855. In this case, the control unit 200 may generate the second parking line based on the first parking line and the inter-line interval determined in step S830. In a state when the second imaginary parking line is generated, the control unit 200 controls the display unit 130 to display an around-view video image including the second imaginary parking line in step S850.

If the first parking line is not tracked in step S840 but the second parking line is tracked in step S860, the control unit 200 generates a first imaginary parking line to apply the first imaginary parking line to the around-view video image in step S865. In this case, the control unit 200 generates a first parking line based on the second parking line and the inter-line interval determined in step S830. In a state when the first imaginary parking line is generated, the control unit 200 controls the display unit 130 to display an around-view video image including the first imaginary parking line in step S850.

If the first parking line is not tracked in step S840 and the second parking line is not tracked in step S860, the control unit 200 continuously tracks the first and second parking lines in step S835.

Figure 9:
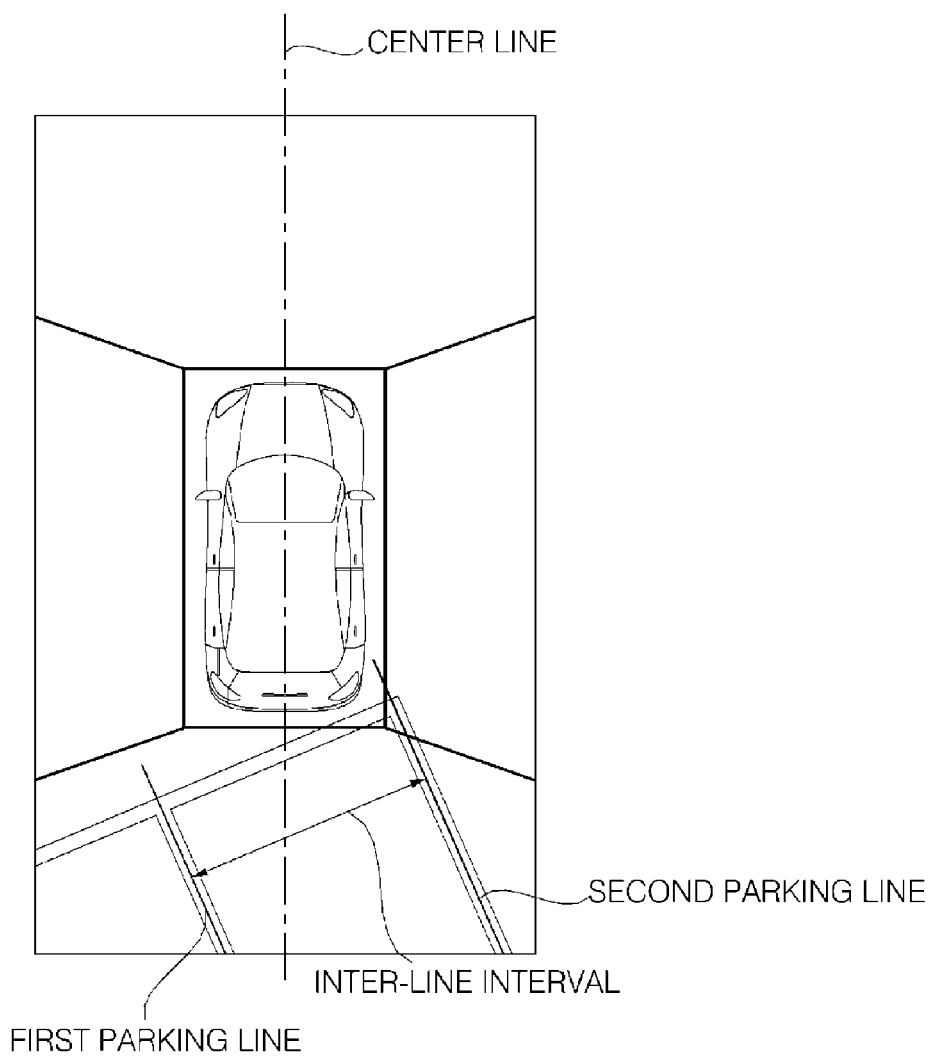
FIG. 9 is a view illustrating an operation of determining an inter-line interval according to the exemplary embodiment shown in FIG. 8.

FIG. 9 is a view illustrating an operation of determining an inter-line interval according to another exemplary embodiment of the present invention.

Referring to FIG. 9, when the first and second parking lines are recognized, the inter-line interval determining unit determines an inter-line interval between the first parking line and the second parking line. That is, the inter-line interval determining unit 224 calculates an inter-line interval between the first parking line and the second parking line from the around-view video image. In consecutive video images, the inter-line interval determining unit 224 determines whether a difference in the inter-line interval between the first parking line and the second parking line is less than a threshold value and determines a target parking section interval. A final parking section interval is set by an average.

FIGS. 10A, 10B, 10C, and 10D are views illustrating an operation of recognizing a second parking line and predicting a first parking line according to an exemplary embodiment of the present invention.

As illustrated in FIGS. 10A and 10B, when a vehicle is parked, if the vehicle is located on the first parking line, the tracking unit 230 does not track the first parking line, but tracks only the second parking line. Here, the tracking unit 230 may track the first and second parking lines based on a difference of angles or a difference of distances between the first and second parking lines in a previous video image and a present video image.

That is, an around-view video image of FIG. 10A is prior to an around-view video image of FIG. 10B. When a left upper end of the around-view video image is considered as an origin point, a horizontal direction is assumed as an X axis and a vertical direction is assumed as a Y axis. In this case, when an angle $\theta$ formed by the X axis and the imaginary line when an imaginary line which is perpendicular to the parking line is drawn from the original point in the video image of FIG. 10A, and an angle $\theta$ formed by the X axis and the imaginary line when an imaginary line which is perpendicular to the parking line is drawn from the original point in the video image of FIG. 10B are compared, and it is determined that the difference between the angles is less than a threshold value, the tracking unit 230 determines the parking lines to be the same.

Alternatively, when a length r of an imaginary line which is perpendicular to the second parking line with respect to the original point in the video image of FIG. 10A, and a length r of an imaginary line which is perpendicular to the second parking line with respect to the original point in the video image of FIG. 10B are compared, and it is determined that the difference between the lengths is less than a threshold value, the tracking unit 230 determines the parking lines to be the same.

As illustrated in FIG. 10C, the tracking unit 230 may obtain the distance r to the second parking line and the angle $\theta$ of the parking line in the around-view video. As described above, the tracking unit 230 may obtain the angle $\theta$ of the second parking line by an angle formed by the X axis and the imaginary line when an imaginary line which is perpendicular to the parking line is drawn from the original point. Further, the tracking unit 230 may obtain the length of the imaginary line to calculate a distance r to the second parking line. In this case, an equation of $r = X \cos(\theta) + Y \sin(\theta)$ is established and r is obtained using the equation.

Figure 10D:
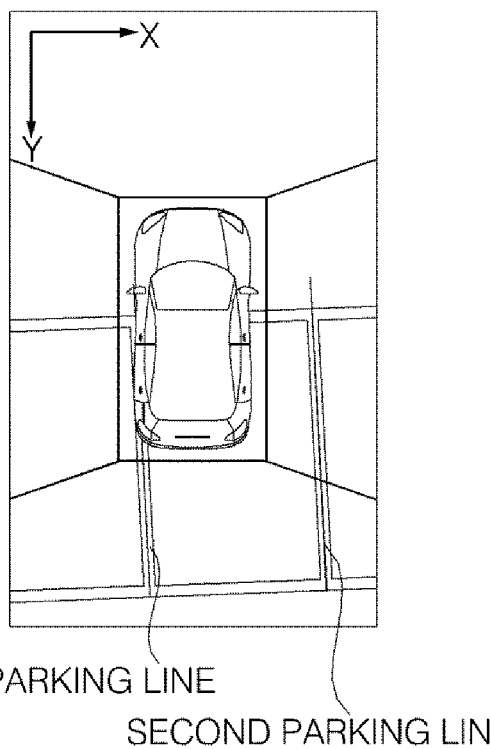

As illustrated in FIG. 10D, when the first parking line is blocked by the vehicle so that the first parking line is not tracked, and only the second parking line is tracked, the parking line generating unit 241 may generate the first parking line based on the inter-line interval determined by the inter-line interval determining unit 224 and the angle θ of the parking line. For example, the first parking line and the second parking line are parallel to each other, so that the parking line generating unit 241 may consider the angle θ of the second parking line as the angle θ of the first parking line. The parking line generating unit 241 may obtain a distance ra to the first parking line by subtracting the inter-line interval from the distance r to the second parking line. The parking line generating unit 241 may generate the first imaginary parking line based on the angle θ of the first parking line and the distance r to the first parking line. The video image applying unit 242 applies the first imaginary parking line to the around-view screen.

In the present exemplary embodiment, even though an operation of predicting the first parking line based on the second parking line has been described, an operation of predicting the second parking line based on the first parking line may be performed by the same principle.

According to an exemplary embodiment of the present invention and the operating method thereof, the control unit 200 may display an AVM composite video image in which an imaginary parking line is set based on video images taken around the vehicle in a target parking section in which no parking line is provided to allow a user to recognize the target parking section of the vehicle, thereby reducing difficulty in parking the vehicle and increasing convenience of the user.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An around-view monitoring (AVM) apparatus, comprising:
   a camera module configured to obtain a plurality of video images from around a vehicle;
   a display configured to display an around-view video image; and
   a controller configured to compose the plurality of video images to generate an around-view video image, detect a first parking line and a second parking line from the around-view video image, track the detected first and second parking lines, and generate an imaginary parking line when any one of the first and second parking lines is not tracked to control the display to output the around-view video image,
   wherein:
   the controller comprises:
      a video composer configured to compose the plurality of video images to generate an around-view video image;
      a detector configured to detect a first parking line and a second parking line from the around-view video image;
      a tracker configured to track the first parking line and the second parking line; and
      a predictor configured to generate an imaginary parking line when one of the first and second parking lines is not tracked;
   the detector comprises an inter-line interval determiner configured to determine an inter-line interval between the first and second parking lines;
   the predictor is configured to predict the first parking line based on the second parking line and the inter-line interval when the first parking line is not tracked, and to predict the second parking line based on the first parking line and the inter-line interval when the second parking line is not tracked; and
   the tracking unit is configured to track the first and second parking lines based on the difference of angles between first and second parking lines in a previous video image and a present video image.

2. The AVM apparatus of claim 1, further comprising a memory configured to store a look-up table,
   wherein the controller is configured to generate the around-view video image using the look-up table.

3. The AVM apparatus of claim 1, wherein the detector comprises:
   a video converter configured to convert the around-view video image into a grayscale video image;
   a top hat filter configured to extract a plurality of feature points using an illumination deviation of the grayscale video image; and
   a parking line recognizer configured to extract line components for the plurality of feature points to recognize the first and second parking lines.

4. The AVM apparatus of claim 1, wherein the predictor comprises:
   a parking line generator which, when any one of the first and second parking lines is not tracked, is configured to generate an imaginary parking line which is not tracked; and
   a video applier configured to apply the imaginary parking line generated by the parking line generator to the around-view video image.

5. The AVM apparatus of claim 1, wherein: the camera module comprises:
   a first camera disposed on the front side of the vehicle and configured to obtain a front surrounding video image of the vehicle;
   a second camera disposed on the rear side of the vehicle and configured to obtain a rear surrounding video image of the vehicle;
   a third camera disposed on the left side of the vehicle and configured to obtain a video image from around the left side of the vehicle; and
   a fourth camera disposed at the right side of the vehicle and configured to obtain a video image from around the right side of the vehicle.

6. The AVM apparatus of claim 1, wherein the display comprises an audio video navigation (AVN) module, which is mounted on the vehicle.

7. A vehicle comprising the AVM apparatus of claim 1.

8. An operating method of an around-view monitoring (AVM) apparatus, comprising:
   obtaining a plurality of video images from around a vehicle;
   generating an around-view video image by composing the video images;
   detecting a first parking line and a second parking line from the around-view video image;
   tracking the first and second parking lines;
   predicting an imaginary parking line when one of the first and second parking lines is not tracked; and
   displaying an AVM image comprising the imaginary parking line, wherein:
the detecting comprises determining an inter-line interval between the first and second parking lines;
the predicting comprises predicting the first parking line based on the second parking line and the inter-line interval when the first parking line is not tracked, and predicting the second parking line based on the first parking line and the inter-line interval when the second parking line is not tracked; and
the tracking comprises tracking the first and second parking lines based on a difference of angles between the first and second parking lines in a previous video image and a present video image.

9. The operating method of claim 8, wherein the generating comprises:
generating the around-view video image using a look-up table stored in a memory.

10. The operating method of claim 8, wherein the detecting further comprises:
converting the around-view video image into a grayscale video image;
extracting a plurality of feature points using an illumination deviation of the grayscale video image; and
extracting line components for the plurality of feature points to recognize the first and second parking lines.

11. The operating method of claim 8, wherein the predicting comprises:
generating an imaginary parking line which is not tracked, when one of the first and second parking lines is not tracked; and
applying the generated imaginary parking line to the around-view video image.

* * * * *